Patented May 15, 1951

2,553,037

UNITED STATES PATENT OFFICE 2,553,037

HALOGENATED PYRIMIDYL-MERCAPTO-ACETIC ACIDS AND DERIVATIVES THEREOF

Jean Druey, Riehen, Switzerland, assignor to Ciba Pharmaceutical Products, Inc., Summit, N. J.

No Drawing. Application June 24, 1949, Serial No. 101,238. In Switzerland July 1, 1948

5 Claims. (Cl. 260—256.5)

The present invention relates to halogenated pyrimidyl-mercapto-acetic acids and derivatives thereof.

In copending application, Ser. No. 789,552, filed December 3, 1947, there are described pyrimidyl - mercapto - carboxylic acids corresponding to the formula

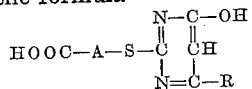

as well as salts, esters and amides thereof. In the foregoing formula, R stands for a hydrocarbon group with 2 to 7 carbon atoms, and A represents a bivalent aliphatic hydrocarbon group with 1 to 4 carbon atoms. These compounds, which are characterized by high antithyroid activity, may be prepared inter alia by the action on a corresponding 2-mercapto-4-hydroxy-pyrimidine of a halogencarboxylic acid of the formula Hal.A.COOH or the corresponding salt, ester or amide.

A primary object of the present invention is the embodiment of compounds characterized by enhanced therapeutic action relative to the compounds heretofore employed in thiouracil therapy. According to the present invention, this object is realized by means of the halogenated pyrimidyl-mercapto-acetic acids corresponding to the formula

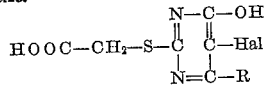

as well as their salts and esters. It has been found that the undesired thyroid hyperplasia, which always appears in thiouracil therapy, is entirely eliminated or suppressed to a minimum, when employing the compounds of the present invention.

In the formula of the preceding paragraph, R stands for hydrogen or a lower aliphatic hydrocarbon radical, and Hal stands for a halogen atom. Those compounds of the said formula wherein Hal is iodine, are especially valuable.

The new 4-hydroxy-5-halogen-pyrimidyl-(2)-mercapto-acetic acids and their derivatives are obtained by treating the corresponding 4-hydroxy-pyrimidyl-(2)-meracapto-acetic acid corresponding to the formula

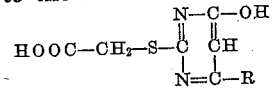

or the corresponding salt, or ester with a halogenating agent, or by reacting a halogenated 2-mercapto-4-hydroxy-pyrimidine corresponding to the formula

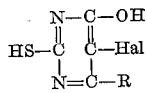

with a halogen-acetic acid, a salt or ester thereof. In the last two formulae, R stands for hydrogen or a lower aliphatic hydrocarbon radical, and Hal stands for a halogen atom.

Esters obtained according to the present invention can be saponified, if desired, while acids obtained according to the invention may be treated with esterifying agents or may be converted into their salts.

The preferred halogenating agents for use in carrying out the halogenation according to this invention are the halogens in elementary form. However, use may also be made of halogen-yielding agents. For example, bromamides and -imides, such as bromosuccinimide may be used for bromination. For iodination, use may be made of elementary iodine and also of, for example, iodine monochloride. The reaction with a halogenating agent is preferably carried out in a diluent medium, which may be of organic or aqueous nature. Most advantageous in this regard are, for example, glacial acetic acid and aqueous alkalies such as sodium bicarbonate, sodium carbonate and caustic alkalies.

The reaction between a 2-mercapto-4-hydroxy-5-halogen-pyrimidine and a halogen-acetic acid or a salt, or ester thereof is preferably also carried out in a diluent medium, such as water or an organic solvent, for example methyl alcohol or ethyl alcohol or acetone, preferably in the presence of an acid-binding agent.

The invention is described in greater detail in the following examples, which are solely illustrative and not at all limitative in character, and wherein parts by weight bear the same relation to parts by volume as does the gram to the cubic centimeter. Temperatures are in degrees centigrade.

Example 1

10 parts by weight of 4-hydroxy-6-methyl-pyrimidyl-(2)-mercapto-acetic acid are dissolved in 85 parts by volume of 2-normal aqueous caustic soda solution, and heated on a boiling water-bath. Thereupon 12.5 parts by weight of iodine are gradually added, whereby dissolution and decoloration take place. Heating is continued for approximately another half hour, the reaction mixture concentrated in vacuo down to about 50 parts by volume and then acidified with 2-normal hydrochloric acid. Such coloration as ensues due to the separation of iodine, is removed by the addition of a small quantity of sodium bisulfite solution. The product is then suction filtered, washed thoroughly with water, and recrystallized from 50% acetic acid. The thus obtained 4-hydroxy-5-iodo-6-methyl-pyrimidyl-(2)-mercapto-acetic acid forms needles which melt at 192-193° with decomposition (splitting off of iodine). When treated with sodium bicarbonate solution there is readily obtained the sodium salt of the 4-hydroxy-5-iodo-6-methyl-pyrimidyl-(2)-mercapto-acetic acid.

The iodination can also advantageously be carried out in aqueous sodium carbonate solution.

*Example 2*

25 parts by weight of 5-iodo-thiouracil (2-mercapto-4-hydroxy-5-iodo-pyrimidine) are dissolved in 150 parts by volume of 2-normal aqueous caustic soda solution. To the solution, heated to about 50°, 9.5 parts by weight of chloracetic acid are added, and heating continued for a further half hour on the boiling water-bath. After cooling, neutralization to litmus is effected with approximately 3-normal hydrochloric acid, and impurities eliminated by filtration. By further addition of hydrochloric acid, 4-hydroxy-5-iodo-pyrimidyl-(2)-mercapto-acetic acid is obtained in crystalline form. For further purification, it is recrystallized from 50% alcohol. The product melts at about 170° with decomposition.

*Example 3*

11.5 parts by weight of 4-hydroxy-6-n-propyl-pyrimidyl-(2)-mercapto-acetic acid are dissolved, on the boiling water-bath, in 200 parts by volume of 2-normal sodium carbonate solution. 12.5 parts by weight of iodine are then added, which dissolve fairly rapidly with decoloration. Heating is then continued for another half hour, the reaction mass cooled and made distinctly acid to congo by acidification with approximately 6-normal hydrochloric acid. The iodinated reaction product is thus precipitated in somewhat colored form. It is dissolved in a small quantity of saturated aqueous sodium bicarbonate solution and again precipitated with hydrochloric acid. For further purification, it can be recrystallized from alcohol. The 4-hydroxy-5-iodo-6-n-propyl-pyrimidyl-(2)-mercapto acetic acid, thus obtained, has a melting point of about 180° with decomposition (splitting off of iodine).

*Example 4*

16 parts by weight of 5-chloro-thiouracil (2-mercapto-4-hydroxy-5-chloro-pyrimidine) are taken up in 100 parts by volume of ethyl alcohol in which 2.3 parts by weight of metallic sodium are dissolved, and then mixed with 12 parts by weight of chloracetic acid ethyl ester. After stirring for two hours, during which time the solution becomes neutral, water is admixed and the solution allowed to stand for some time before it is suction filtered. The 4-hydroxy-5-chloro-pyrimidyl-(2)-mercapto-acetic acid ethyl ester is thus obtained.

In the same manner, by starting with other alkyl-esters of chloro acetic acid, such as the methyl-, propyl-, butyl- and amyl ester of chloro acetic acid, the corresponding alkyl esters of 4-hydroxy-5-chloro- or other pyrimidyl-(2)-mercapto-acetic acid are obtained.

10 parts by weight of 4-hydroxy-5-chloro-pyrimidyl-(2)-mercapto-acetic acid ethyl ester are dissolved in 100 parts by volume of 2 N-caustic soda solution and heated for one hour on the water bath. From the reaction solution the 4-hydroxy-5-chloro-pyrimidyl-(2)-mercapto-acetic acid of the formula.

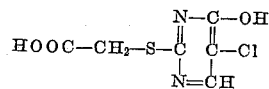

is obtained by precipitation with hydrochloric acid. The melting point is unsharp (decomposition), approximately at 190° C.

*Example 5*

22 parts by weight of 5-bromo-6-methyl-thiouracil (2-mercapto-4-hydroxy-5-bromo-6-methyl-pyrimidine) are dissolved in 150 parts by volume of 2 N-caustic soda solution. To this solution, when heated to about 50° C., are added 9.5 parts by weight of chloracetic acid and heating is then continued for half an hour on the boiling water bath. After cooling, 3 N-hydrochloric acid is added until the solution is neutral to litmus, and purified by filtration. Through a further addition of hydrochloric acid, the 4-hydroxy-5-bromo-6-methyl-pyrimidyl-(2)-mercapto- acetic acid is obtained in crystallized form. For further purification, it is recrystallized from 50% alcohol. Melting point, with decomposition, at about 160° C.

*Example 6*

3.3 parts by weight of 4-hydroxy-5-iodo-6-methyl pyrimidyl-(2)-mercapto-acetic acid are dissolved in 7.5 parts by volume of 2 N-caustic soda solution. To this solution there is added 0.6 part by weight of calcium chloride, dissolved in 3 parts by volume of water. After standing in the cold for quite some time, the calcium salt of 4-hydroxy-5-iodo-6-methyl-pyrimidyl-(2)-mercapto acetic acid precipitates in the form of little needles. It is suction-filtered and dried at 50° C.

Having thus described the invention what is claimed is:

1. A member selected from the group consisting of the halogenated pyrimidyl-mercapto-acetic acids corresponding to the formula

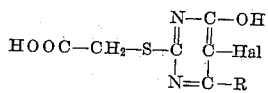

and their cation salts and alkyl esters, wherein Hal stands for a halogen atom and R stands for a member selected from the group consisting of hydrogen and lower aliphatic hydrocarbon radicals.

2. A 4-hydroxy-5-iodo-pyrimidyl-(2)-mercapto-acetic acid corresponding to the formula

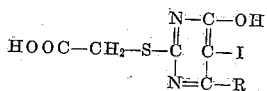

wherein R stands for a member selected from the group consisting of hydrogen and lower aliphatic hydrocarbon radicals.

3. The 4-hydroxy-5-iodo-6-methyl-pyrimidyl-(2)-mercapto-acetic acid.

4. The 4-hydroxy-5-iodo-pyrimidyl-(2)-mercapto-acetic acid.

5. The 4-hydroxy-5-iodo-6-n-propyl-pyrimidyl-(2)-mercapto-acetic acid.

JEAN DRUEY.

No references cited.